United States Patent
Siders et al.

(10) Patent No.: US 6,694,124 B2
(45) Date of Patent: Feb. 17, 2004

(54) ONBOARD TRAINING

(75) Inventors: Clementina M. Siders, Orlando, FL (US); Frank A. Ashton, Atlantic Beach, FL (US); David B. Wood, Palm Bay, FL (US); David S. Elliott, Rowlett, TX (US); Jack W. Burgess, Orange Park, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 182 days.

(21) Appl. No.: 10/001,026

(22) Filed: Nov. 2, 2001

(65) Prior Publication Data

US 2003/0087222 A1 May 8, 2003

Related U.S. Application Data

(60) Provisional application No. 60/246,216, filed on Nov. 3, 2000.

(51) Int. Cl.[7] .................................................. G09B 3/00
(52) U.S. Cl. ................ 434/350; 434/307 R; 434/365; 345/854
(58) Field of Search ................ 434/28, 118, 307 R, 434/308, 322, 323, 350, 362, 365; 709/204–206, 223, 224, 312; 707/3, 10, 103 R; 706/45, 53, 61; 703/2, 21; 705/10, 26, 28; 345/8, 156, 419, 473, 522, 661, 705, 733, 788, 805, 854

(56) References Cited

U.S. PATENT DOCUMENTS

| | | | | |
|---|---|---|---|---|
| 5,644,686 | A | * 7/1997 | Hekmatpour | 706/45 |
| 5,727,950 | A | * 3/1998 | Cook et al. | 434/350 |
| 6,119,147 | A | * 9/2000 | Toomey et al. | 709/204 |
| 6,289,299 | B1 | * 9/2001 | Daniel et al. | 703/21 |
| 6,377,263 | B1 | * 4/2002 | Falacara et al. | 345/473 |
| 6,388,688 | B1 | * 5/2002 | Schileru-Key | 345/854 |
| 2002/0163497 | A1 | * 11/2002 | Cunningham et al. | 345/156 |

* cited by examiner

Primary Examiner—Joe H. Cheng
(74) Attorney, Agent, or Firm—Eliot Abelesfia

(57) ABSTRACT

Disclosed is self-paced, system-level familiarization training customized to the trainee's individual training needs that is sufficiently flexible to accommodate individuals with varying levels of expertise. Training is accomplished by determining or directing the location of students relative to an on-board system, then stimulating the correct Interactive Media Instruction (IMI) based on that location. Effectiveness is dependent on the factors; location technology, IMI, and movement algorithm; and, the interaction between these three factors.

10 Claims, 1 Drawing Sheet

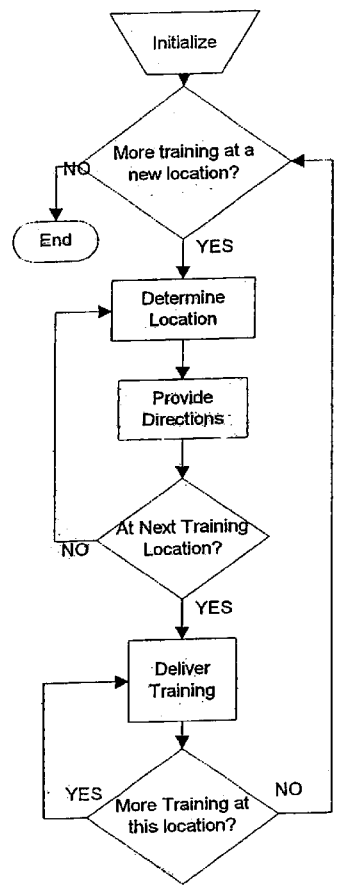
Fig 1 Functional Flow Diagram
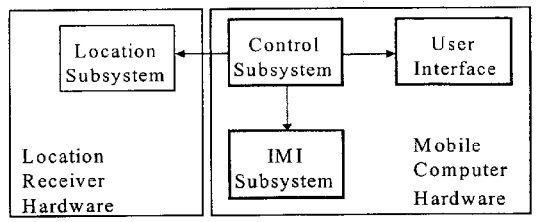
Fig 2 System Block Diagram
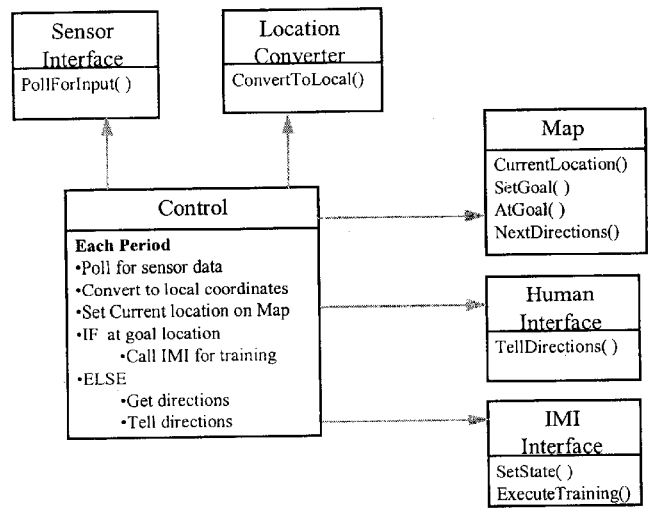
Fig 3 Software Elements
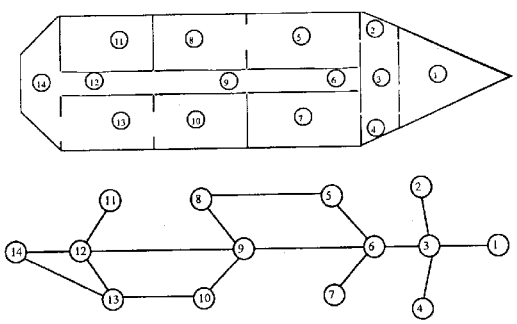
Fig 4 Compartment Map

ONBOARD TRAINING

This application claims the benefit of U.S. Provisional Application No. 60/246,216, filed Nov. 3, 2000.

BACKGROUND OF THE INVENTION

1. Field of the Invention

The present invention relates generally to training systems and more particularly to training systems that interact with real environments.

2. Related Art

Training is generally accomplished through the integration of training both onboard and off the ship, in the schoolhouse. Unfortunately, there may be a substantial period of lapsed time between the detailed schoolhouse training and the actual hands-on, visual reinforcement of seeing the equipment in place, onboard the ship. The lapsed time may be generally detrimental to the effectiveness of training, such that substantial, additional time is required to accomplish the actual shipboard system familiarization. Also, some ships have unique system modifications, which conflict with the schoolhouse training material, drawings, video, and photographs. The trainee may not be aware of these modifications until he arrives at the ship. Historically, the on-board training process has required instruction and assistance by knowledgeable, experienced personnel. For example, during familiarization training, the instructor walks the trainee through the systems and explains the functions of various systems. This process is often very time-consuming, frequently requiring lengthy delays in completing the necessary training. The instruction necessary for each trainee may also vary significantly because of the experience levels of the mentor and the student. With reduced shipboard manning levels and further manning reductions planned in the future, it will be important for both training systems developers and the customers to develop and use new methods to deliver training in a timely manner that meet our customer's readiness needs.

SUMMARY OF THE INVENTION

The present invention provides a concept for a novel way to provide onboard training using location technology and mobile computing products (both hardware and software). It is a self-directed, self-paced, standardized training/orientation system for shipboard members. Self-directed and self-paced means that the trainee will be able to use a portable computing device to determine training locations on the ship, receive appropriate Interactive Media Instruction (IMI) at the location(s) desired, and receive guidance to the next point of training until the training sequence is complete. This training can include high-level instruction such as familiarization training or more complex training such as maintenance, operational training and team training One aspect of the invention is a data processing system for training a trainee who is located within a predefined area of three-dimensional physical space having at least two predefined training nodes at which training is to be received by the trainee. The system includes a location subsystem for locating the trainee within the predefined area of physical space, an instruction subsystem for providing training to the trainee at the training node and a control subsystem. The control subsystem has a map element comprising data representing the predefined area of the physical space and the nodes therein. The control subsystem is responsive to the location subsystem. The control subsystem also comprises logic for determining if training should be provided to the trainee at the node. The control system additionally controls the training for delivery of training at the node when training is required. Finally, the control system directs the trainee to another node if training is required at the second training node. A human interface for providing information from the control system to the trainee is provided.

In another aspect of the invention a method in a data processing system provides instruction to a trainee whose locations are provided by sensor data. One or more locations define goal locations. The method polls for sensor data and then converts the sensor data to local coordinates, setting current location on a map. The method calls for training if the trainee is at one of the goal locations, and provides directions to another goal location if the trainee is not at one of the goal locations.

BRIEF DESCRIPTION OF THE DRAWINGS

FIG. 1 is a functional flow diagram of the present invention;

FIG. 2 is a system block diagram of the present invention;

FIG. 3 is a functional diagram of the software elements of the present invention; and, FIG. 4 is a pictorial representation of a compartment map for a ship-board embodiment of the present invention.

DESCRIPTION OF A PREFERRED EMBODIMENT

A simple functional flow diagram of the self-directed training system of the present invention is provided in FIG. 1.

System Block Diagram

By use of the localization technology, the system identifies its location within the ship to define a starting reference or initialization point. It then asks if training at a new location is needed. If so, then it determines the next location, routing and appropriate direction to move to the designated training location. That question is repeated through each location node until the trainee arrives at a training node. Location nodes are physical points were the trainee has the option to change their direction. For example, a passageway intersection, or a ladder connection between decks. Upon arrival at the training node, training is delivered until complete. The cycle then repeats itself until all training is complete.

The functional flow diagram described in FIG. 1 may be realized by a system composed of three (3) subsystems: the Location Subsystem, the Control subsystem (see FIG. 2), and Interactive Media Instruction (IMI) subsystem.

Location Subsystem

The Location Subsystem provides the location of the student, and may be composed of one/some of the technologies. Knowing where the trainee is physically located on the ship is a key requirement of this training system design. The trainee is expected to have little or no awareness of the shipboard layout and the system must enable him to establish his specific location on the ship within a reasonable margin of error. Locating the individual accurately is also important so that appropriate instructions can be given by the system to direct the individual to each specific training site or node.

Some of the technologies currently being utilized in a variety of settings to accomplish the locating function include but are not limited to:

Radio Frequency (RF)

Infrared (IR)

Location Bar Coding

Global Positioning System (GPS)

Video Mapping

Fixed Audio Touring

Vision Recognition (Black/White or Color Marker Patterns)

Control Subsystem

The Control subsystem receives the trainee's location from a reading device input. It then determines if the trainee is at the designated training site, or provides directions to the student on how to proceed to the next training location.

The software architecture associated with controlling a shipboard location identification system integrated with mobile computing and interactive courseware presents no significant technical hurdles.

The software architecture is depicted in FIG. 3, and includes: elements to hide the outside interfaces (reader or sensor, IMI, Human Computer Interface (HCI)), a map element that contains a graph representation of the ship's spaces, an element to convert the reader or sensor data into map-compatible locations, and a 'control' element that sequences and coordinates the operation of the software.

Control Element

The control element is activated periodically (once per second) as a training session is in progress. As the notes in the Figs imply, this element will ask the Sensor for its current data. The data from the Sensor is then converted to a format suitable for input of current position on the map. The Map, which knows the student's goal position is asked if the goal has been reached. If the student is at the goal location, the IMI software is activated. If the student is not at the goal location, the map provides directions to reach goal, which are then provided to the student by the HCI.

Boundary Element

The boundary element to the Sensor hardware has allowed us to vary the type of devices used, and even to simulate the input. For the initial prototype effort, this element's PollForInput operation simply reads a test file to provide stimulus to the system.

Map Element

The map, a connected graph, consists of a set of nodes that represent the spaces, and vertices that represent the passageway between these spaces. This association is shown (overly simplified, and for a single deck) in FIG. 4.

The Shortest-Path-First algorithm has been used to traverse the graph from any location to a designated goal, however other algorithms can be implemented to achieve similar results. The map element also contains the information needed to provide directions from one location to the next.

The Human Interface outputs directions using an appropriate method for the type of training being provided. This may be a simple text string to a display (as in the prototype) or synthesized speech. In either case, changes in the Human Interface are contained in this element.

The IMI interface encapsulates the interface to a commercial authoring product tailored to fit the shipboard training and activated when the student has reach a designated location. Each training location could have its courseware encapsulated in its own executable file.

Alternatively, the courseware could be in one executable, and then a command line interface should allow parameters to be passed to indicate the portion of the courseware that should be delivered. Separate executables are the preferred approach because of the reduction in life cycle maintenance costs. However, proper file organization is essential when considering this approach.

Interactive Media Instruction (IMI) Subsystem

The IMI subsystem is configured and initiated by the Control subsystem. Interactive Multimedia Instruction (IMI) is the portion of this system that delivers the instruction and verifies the trainee's understanding once he has reached each of his training (goal) locations. Interactive Multimedia Instruction is interactive, electronically delivered training. Interactive training software dynamically reacts to the trainee's input allowing for instructional delivery that is tailored and optimized for each individual's needs.

Multimedia-capable systems can utilize text, graphics, animations, audio, and high quality video. With the addition of interactivity, trainees are able to control the presentation. They can determine the order in which topics are presented and can advance through the presentation at their own pace. Sections of the material can be repeated. The learner has an active and engaging role in the instruction. Students can practice newly acquired skills and can be tested in order to determine whether to continue with the instruction or whether to provide remedial training.

Once the trainee has reached a training location, the system initiates the execution of the site-specific Interactive Multimedia Instruction. Headphones with a boom microphone and a corded keyboard can be used to facilitate the interactivity. The interaction can require the student to respond to questions designed to test his knowledge of the training site equipment at the conclusion of the instructional phase. If the trainee does not successfully answer the test questions, remedial training is immediately instituted by the courseware.

In some cases, the trainee will remain at the training site until he has successfully completed the instruction and practice exercises (optional). The trainee also has the option to bookmark his place and return to where he exited the instruction at a later time. After the objectives at that site have been met, the IMI relinquishes control and the system directs the student to the next training location.

There are several advantages of the present invention. It minimizes the need for the more experienced shipboard personnel (mentors) to provide training for new personnel. The proposed system allows each trainee to move, self-directed, at a self-paced level of training. The training is standardized so that the quality and consistency is independent of the experience level of the on-board mentors. It also provides for enhanced, interactive training with much higher levels of retention and a significant reduction in the amount of time needed to complete training.

Alternatives to the embodiment shown, or additions to the features described above include the application of the present invention to environments not limited to shipboard training. The present invention can be used in buildings, planes, etc. Further, The present invention can be used in the commercial, military or in an educational setting.

What is claimed is:

1. A data processing system for training a trainee who is located within a predefined area of three-dimensional physical space having at least two predefined training nodes at which training is to be received by the trainee comprising:

a location subsystem for locating the trainee within the predefined area of physical space;

an instruction subsystem for providing training to the trainee at the training node;

a control subsystem having a map element comprising data representing the predefined area of the physical space and the nodes therein, the control subsystem responsive to the location subsystem, the control subsystem comprising logic for determining if training should be provided to the trainee at the node; the control system controlling the training for delivery of training at the node when training is required, and the control system further directing the trainee to another node if training is required at the second training node; and a human interface for providing information from the control system to the trainee.

2. The data processing system of claim 1 wherein the means for locating a trainee is selected from a technology group consisting of radio frequency, infrared, location bar coding, global positioning system, video mapping, fixed audio touring and vision recognition.

3. The data processing system of claim 1 wherein the logic for determining if training should be provided includes asking the trainee if training is needed.

4. The data processing system of claim 1 wherein the logic for determining if training should be provided comprises a signal from the instruction subsystem.

5. The data processing system of claim 1 wherein the control subsystem receives the location of the trainee from a reading device input.

6. The data processing system of claim 1 wherein the human interface for providing directions to the trainee comprises a text string display.

7. The data processing system of claim 1 wherein the human interface for providing directions to the trainee comprises synthesized speech.

8. The data processing system of claim 1 wherein the instruction system includes interactive media instruction.

9. A method, in a data processing system, to provide instruction to a trainee whose locations are provided by sensor data, wherein one or more locations define goal locations the method comprising: polling for sensor data; converting the sensor data to local coordinates; setting current location on a map; calling for instruction if the trainee is at one of the goal locations; and providing directions to another goal location if the trainee is not at one of the goal locations.

10. The method of claim 9 wherein the directions include supplying the shortest path to reach another goal location.

* * * * *